United States Patent [19]

Okado

[11] Patent Number: 4,748,550
[45] Date of Patent: May 31, 1988

[54] PULSE WIDTH MODULATOR USED FOR A POWER CONVERTER WITH A TRANSFORMER

[75] Inventor: Chihiro Okado, Tokyo, Japan

[73] Assignee: Kabushiki Kaisha Toshiba, Kawasaki, Japan

[21] Appl. No.: 22,623

[22] Filed: Mar. 5, 1987

[30] Foreign Application Priority Data

Mar. 7, 1986 [JP] Japan .................................. 61-48639

[51] Int. Cl.$^4$ ............................................. H02M 7/44
[52] U.S. Cl. ........................................ 363/98; 363/17; 363/41
[58] Field of Search ..................... 363/17, 41, 98, 132, 363/136

[56] References Cited

U.S. PATENT DOCUMENTS

| | | | |
|---|---|---|---|
| 4,071,812 | 1/1978 | Walker | 363/17 X |
| 4,390,940 | 6/1983 | Corbefin et al. | 363/132 |
| 4,541,041 | 9/1985 | Park et al. | 363/98 X |
| 4,586,119 | 4/1986 | Sutton | 363/17 |

FOREIGN PATENT DOCUMENTS 60-24190 2/1985 Japan .

OTHER PUBLICATIONS

Gijutsu, Y., "Inverter Controlled Electric Resistance Welder", *Welding Technology*, p. 30, Mar., 1985, Japan.

*Primary Examiner*—Patrick R. Salce
*Assistant Examiner*—Marc S. Hoff
*Attorney, Agent, or Firm*—Foley & Lardner, Schwartz, Jeffery, Schwaab, Mack, Blumenthal & Evans

[57] ABSTRACT

This apparatus is a power converter which delivers a pulse produced based on a dc voltage to the primary side of a transformer with its polarity being changed per half cycle to take out an ac power from the secondary side thereof. By modulating the pulse width of a pulse delivered, the output power becomes adjustable. By detecting a current on the primary side of the transformer, current change rates at positive and negative half cycles are calculated. By comparing these change rates at the both cycles, magnetic deviation of the transformer can be detected. With the pulse width correcting means, pulse widths of pulse delivered at positive and negative cycles are adjusting so as to cancel such a magnetic deviation. The control for preventing magnetic deviation described above is realized as a control having a very fast response. In addition, such a control enables the transformer to be operative in a range extremely close to the range where the transformer is saturated.

6 Claims, 8 Drawing Sheets

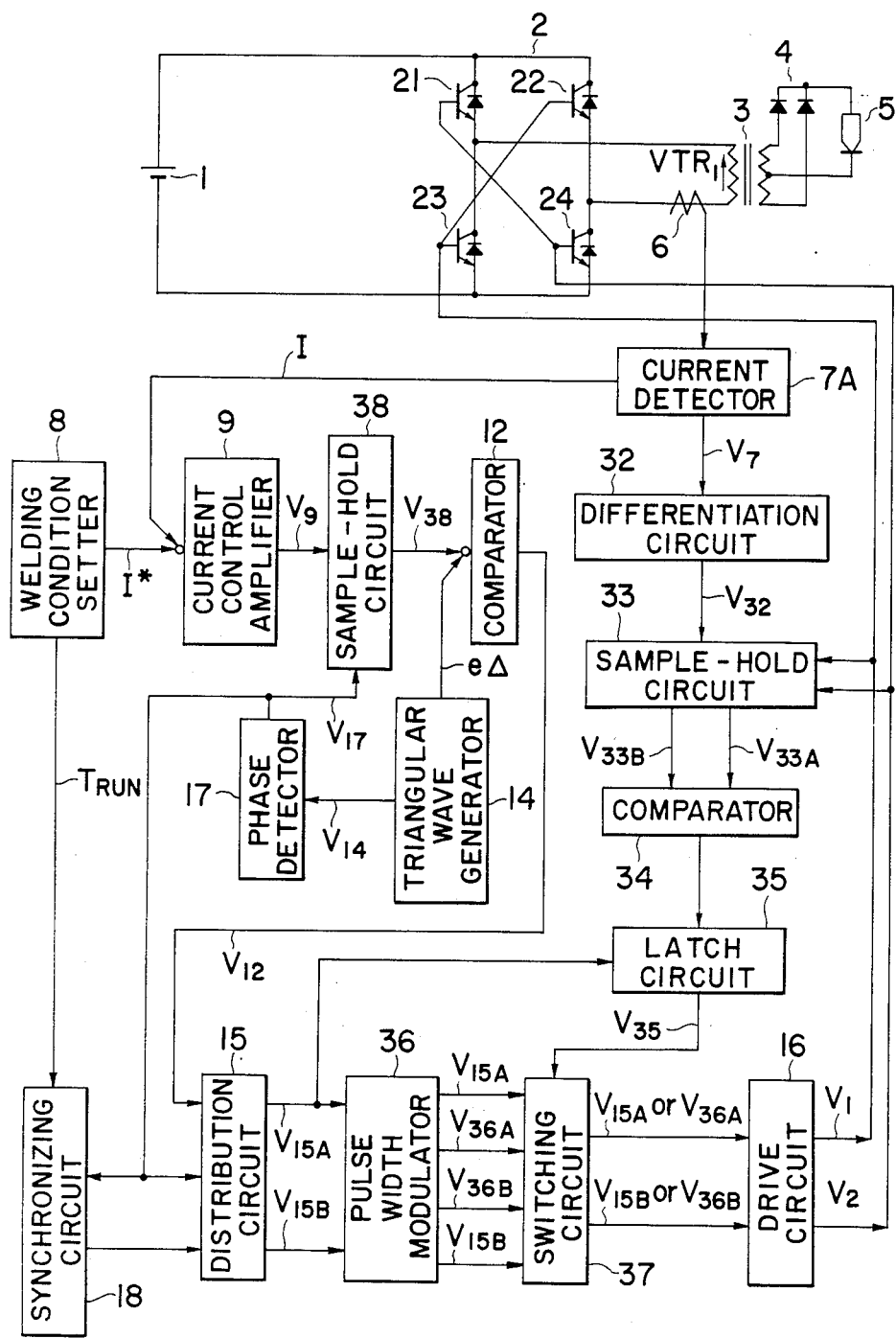
F I G. 2

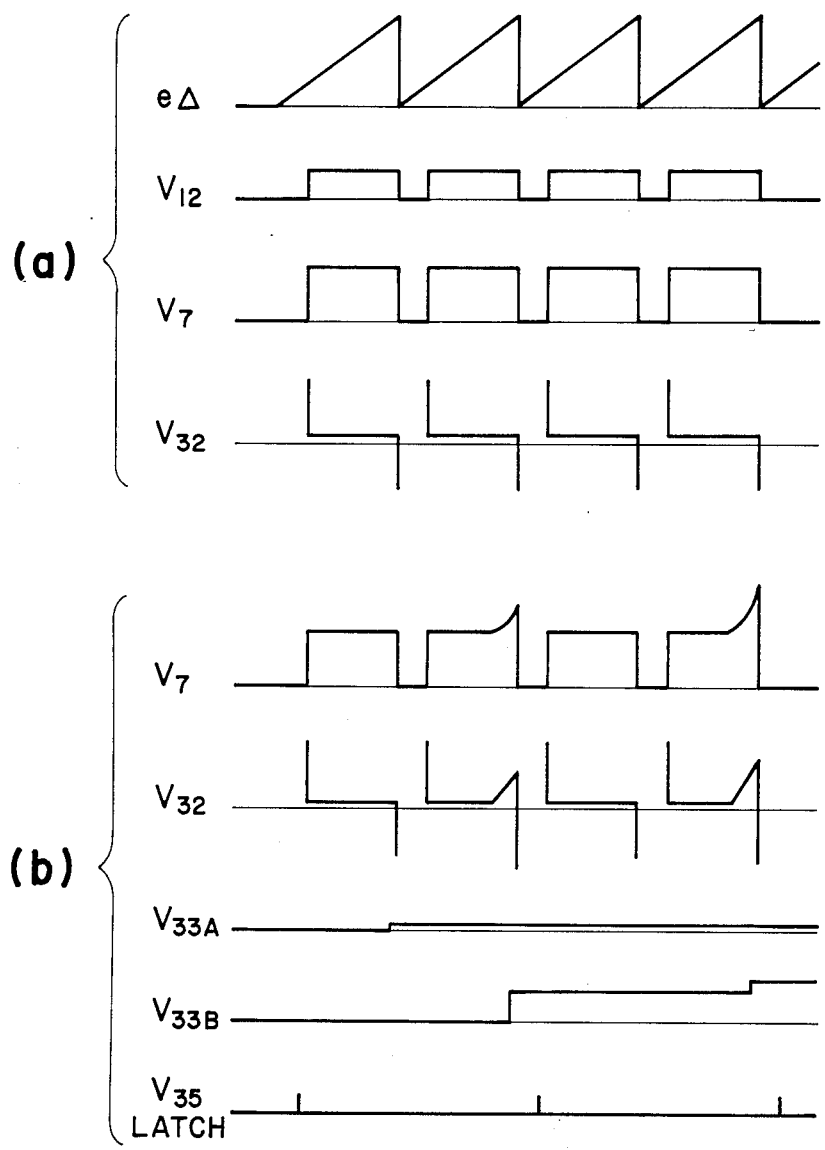
F I G. 5

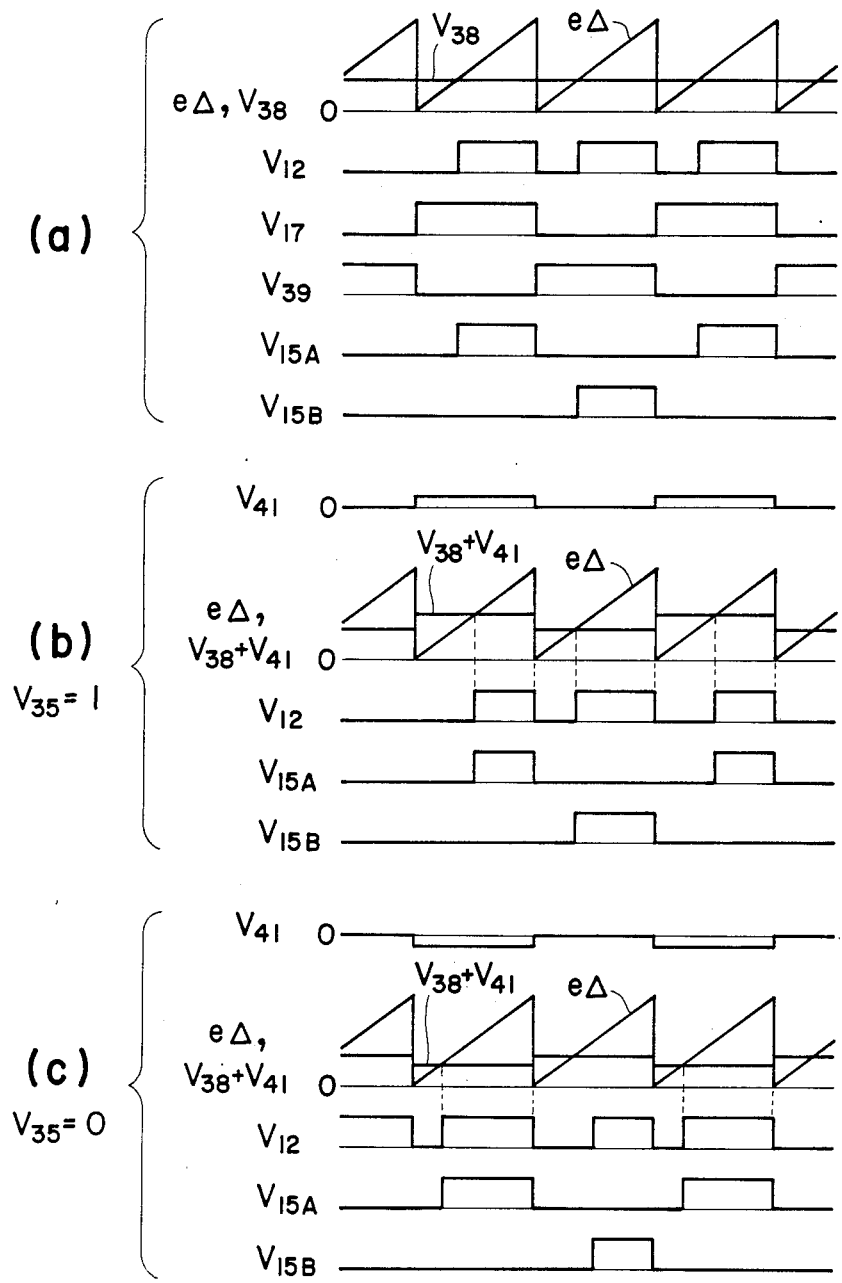
F I G. 9

PULSE WIDTH MODULATOR USED FOR A POWER CONVERTER WITH A TRANSFORMER

BACKGROUND OF THE INVENTION

The present invention relates to an apparatus which converts a dc (direct current) to an ac (alternating current) by a pulse width modulation control (which will be called a "PWM control" hereinafter) to deliver a power through a transformer, and more particularly to a power converter provided with means for preventing magnetic deviation of a transformer.

When converting a dc to an ac using an inverter to deliver the ac power through a transformer, the transformer may be reduced in size by increasing the frequency of the ac.

Conventionally, electric resistance welders have adopted a method to adjust a power by the phase control of the commercial power supply to change to a large current through a transformer. When a robot-controlled system is applied thereto, it is necessary to reduce and lighten the transformer. In this case, unless there is conducted a control such that no dc component is included in the ac applied to the primary side of the transformer, i.e., a control such as to prevent magnetic deviation, it is impossible to design the transformer so that its magnetic flux density becomes high, thus to lighten it.

Circuits for preventing magnetic deviation of the transformer in the electric resistance welders are disclosed, for example, in "Inverter controlled electric resistance welder", FIG. 3 and p. 30, March 1985 in Welding technology (Yosetsu Gijutsu in Japanese) and "Circuit for preventing magnetic deviation of a push-pull converter" in the Japanese publication for Utility Model No. 24190/1985. An example of a circuit of this kind is shown in FIG. 1.

A dc voltage of a dc power supply 1 is converted to an ac voltage by an inverter bridge 2 and is delivered to the primary side of a transformer 3. A voltage on the secondary side of the transformer 3 is rectified by a rectifier 4 and is delivered to a welding electrode 5. As a result, a welding current of several thousands to ten thousands of amperes flows through the welding electrode 5. Thus, welding is conducted. The control of the welding current is carried out by the PWM control of the inverter bridge. It is to be noted that the welding current has been smoothed by the reactor components including the welding electrode circuit.

The inverter bridge 2 is composed of electric valves 21 to 24 each comprising a transistor and a diode which are parallelly connected.

A current on the primary side of the transformer 3 is detected by a current transformer 6. The primary current thus detected is converted to a dc current detection signal I by a current detector 7.

A welding condition setter 8 sets a welding current reference signal I* and a welding time signal $T_{RUN}$. During the welding time $T_{RUN}$, the inverter bridge 2 will be operated. An error between the current reference signal I* and the current detection signal I is amplified by a current control amplifier 9. The error signal thus obtained is input to comparators 12 and 13 via adders 10 and 11, respectively. Then, respective outputs from the comparators 12 and 13 are compared with an output signal eΔ of a triangular wave generator 14. Thus, PWM signals $V_{12}$ and $V_{13}$ are produced. A distribution circuit 15 responds to these PWM signals $V_{12}$ and $V_{13}$ to drive two groups of the electric valves 21 and 24, and 22 and 23 through a drive circuit 16, respectively. Namely, the phase of the triangular wave generator 14 is detected by a phase detector 17. The phase signal thus detected is delivered to the distribution circuit 15 and a synchronizing circuit 18. The distribution circuit 15 produces a drive signal for driving electric valves 21 and 24 and a drive signal for driving electric valves 22 and 23 on the basis of the phase signal thus delivered. The synchronizing circuit 18 delivers an operating signal to the distribution circuit 15 in synchronism with the phase signal thus delivered for a time period corresponding to the welding time $T_{RUN}$. The distribution circuit 15 outputs a drive signal during which the operating signal is delivered. Thus, the drive circuit 16 drives the inverter bridge only during the welding time $T_{RUN}$.

The current difference detector 19 separates the current detection signal I into currents assigned to half cycles by the phase signal from the phase detector 17 to detect a difference between currents at positive and negative cycles. The current difference is amplified by an amplifier 20 and is delivered to the adders 10 and 11 as a current balance correction signal. The current balance correction signal delivered to the adder 11 is inverted by an inverting circuit 31. Thus, there is conducted a control such that a pulse width for applying an electric current on the side of one half cycle where more current flows is caused to be narrowed and a width for applying an electric current on the side of the other half cycle where less current flows is caused to be widened. The reason why there occurs a need to conduct such a control to detect an actual current to balance currents per half cycle is that the electric valves have operating delays inherent thereto, and their values are different per each element or vary in dependence upon temperature. The variation of such operating delays allows the current values at the positive and negative half cycles to be unbalanced. For example, in the case of a power transistor having a rating voltage of 1000 V and a rating current of 300 A, there occur variations per each element such that the delay time during turn-on varies within a range of 1 to 2 μs and the delay time during turn-off varies within a range of 15 to 30 μs. Particularly, the delay time during turn-off further varies by approximately 50% due to the influence of temperature. In addition, when an attention is drawn to the fact that a drive circuit for the power transistor has a delay time of several μs, it is necessary for a certain element to permit the variation of the overall operating delays during turn-on and turn-off to be approximately equal to 10 μs. Assuming now that a frequency of 1 KHz is delivered to the transformer, the half cycle is equal to 500 μs and the variation of the operating delay of the transistor is expressed as 10 μs/500 μs which is equal to about 2%.

Such a variation allows the primary current to produce dc components. Thus, when an attempt is made to fabricate a transformer which is not saturated for such dc components, the weight of the transformer is increased. As a result, it is not suitable to incorporate such a transformer into a robot for welding.

For the reason stated above, it is necessary to adopt a control method such that even when a variation of the operating delay of the electric valve etc. occurs, no dc component is applied to the transformer, and to make the transformer small-sized and light.

However, the above-mentioned prior art has adopted a system to detect an error per each half cycle to effect a control so that the error becomes equal to zero and therefore it is difficult to conduct such a control for reasons stated below.

(a) Since the transformer current before the magnetic flux density of the transformer is saturated takes the value of 2 to 3% with respect to the transformer rating current, the detection of unbalance before saturation is difficult. As a result, with the conventional apparatus, the magnetic flux density of the transformer becomes saturated and the unbalance will not be detected until an excitation current has been increased.

(b) Since the control response of the current balance control is slow, when an iron core having a good characteristic which rapidly causes saturation is applied, there is the possibility that a large excitation current transiently flows, giving rise to the necessity of increasing the current capacity of the inverter bridge.

As described above, since the conventional system effects a control on the basis of the detection of the fact that the magnetic flux density of the transformer has been saturated, the control is delayed and it is necessary to carry out a design such that the magnetic flux density of the transformer is low, resulting in difficulty of the limit design of the transformer.

In addition, when there is employed a method to turn on over a range of an electric angle of 180 degrees at positive and negative cycles for ensuring the inverter output of 100%, the current balance control is impossible because the PWM control cannot be carried out.

Accordingly, with the conventional apparatus, it is impossible to realize a utilization such that the inverter output voltage is equivalent to 100%. Thus, it is necessary to always leave the voltage control range by about 10%. For this reason, the inverter capacity is increased by an amount corresponding thereto. This gives a hindrance in realization of the small-sized and light transformer.

SUMMARY OF THE INVENTION

With the above in view, the present invention has been made and its object is to provide a circuit for preventing magnetic deviation of a transformer which is capable of effecting a control such that the integrated value of a voltage applied to the transformer, i.e., magnetic flux at the positive half cycle is always equal to that at the negative half cycle, which is free from response delay, and which permits the transformer to be small and light.

To solve the above-mentioned problems, the present invention provides an apparatus provided with a PWM inverter in which its output is adjusted by the PWM control to deliver a power to a load through a transformer, the apparatus comprising current detector means for detecting a current of the transformer, current change rate calculating means for calculating a current change rate from the current signal thus detected, current change rate comparing means for separating the current change rate into a current change rate at the positive half cycle and a current change rate at the negative half cycle to compare them to judge whether or not the former is larger than the latter, and pulse width correcting means for correcting a pulse width of the PWM depending upon the judgement result.

In the above-mentioned arrangement, a current change rate is detected by the current rate detector means on the basis of the transformer current detected by the current detector means to predict to what degree the magnetic flux of the transformer iron core is saturated. In addition, the current change rate is separated into a current change rate at the positive half cycle and a current change rate at the negative half cycle by the current change rate comparing means in synchronism with a PWM control signal. The magnitudes thereof are compared to judge whether or not the former is larger than the latter, whereby the direction of the magnetic deviation of the magnetic flux is judged. On the basis of the judgement result of the direction of the magnetic deviation, the pulse width correcting means corrects the pulse widths of the PWM control signals for positive and negative cycles so that magnetization is applied in a direction opposite to the direction of the magnetic deviation to prevent the deviation of the magnetic flux of the transformer on the average.

BRIEF DESCRIPTION OF THE DRAWINGS

FIG. 2 is a circuit diagram showing an embodiment of a power converter provided with means for preventing magnetic deviation according to the present invention;

FIGS. 3 to 6 are views for explaining the operation of the circuit shown in FIG. 2, respectively;

FIG. 9 is a view for explaining the operation of the circuit shown in FIG. 8.

DETAILED DESCRIPTION OF THE PREFERRED EMBODIMENTS

Figure 1:
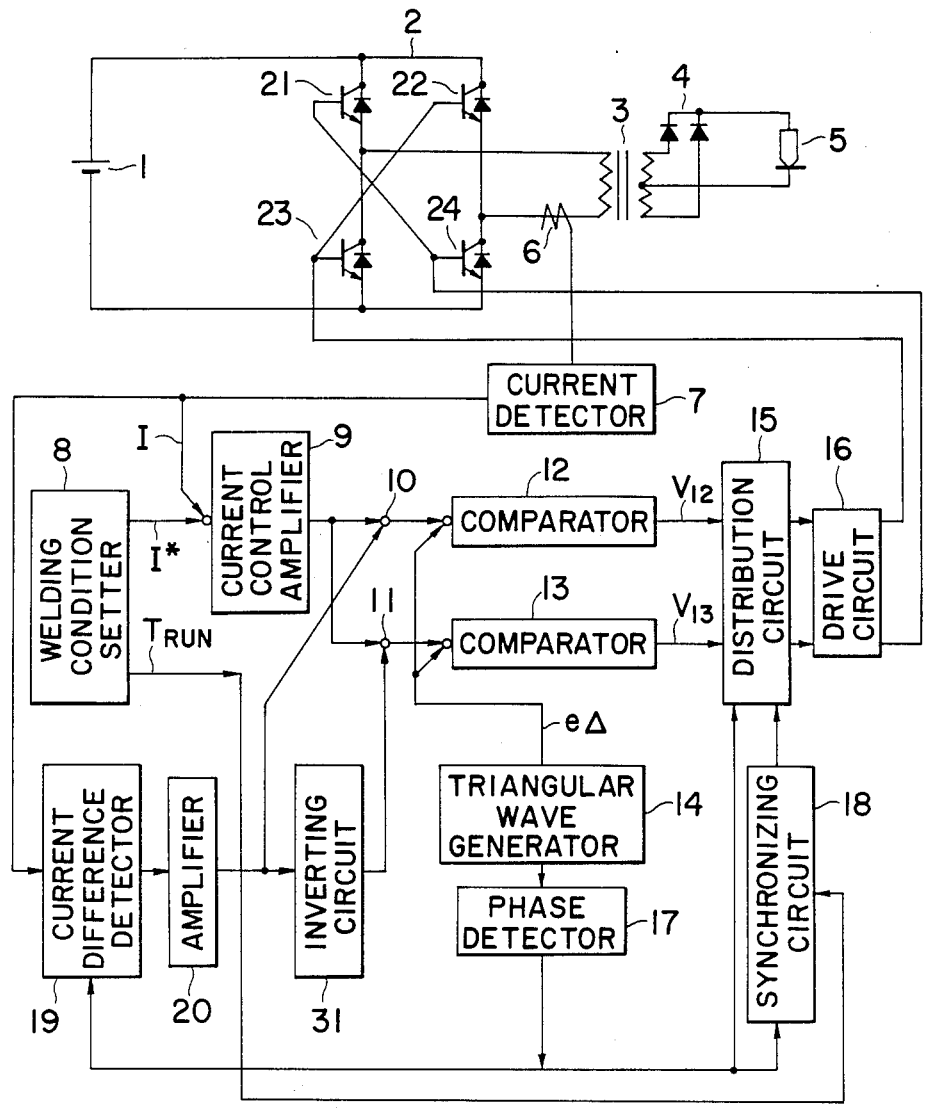
FIG. 1 is a circuit diagram showing a conventional power converter provided with means for preventing magnetic deviation.

An embodiment of the present invention is shown in FIG. 2. The components identical to those of the conventional circuit in FIG. 1 are designated by the same reference numerals, respectively. First, the outline of the arrangement of this circuit will be described.

A dc voltage of the dc power supply is converted to an ac voltage by the inverter bridge 2 and is delivered to the primary side of the transformer 3. A voltage on the secondary side of the transformer 3 is rectified by the rectifier 4 and is delivered to the welding electrode 5. As a result, a welding current of several thousands to several ten thousands of amperes flows through the welding electrode 5 to conduct welding. The control of the welding current is carried out by the PWM control of the inverter bridge 2. It is to be noted that the welding current has been smoothed by reactor components including the welding electrode circuit.

The inverter bridge 2 is composed of electric valves 21 to 24 each comprising a transistor and a diode which are connected in parallel.

A current on the primary side of the transformer 3 is detected by the current transformer 6 and is converted to a dc current detection signal I by a current detector 7A. The current detector 7A outputs the current detection signal I used in the conventional circuit and a signal $V_7$ for detecting an instantaneous current. The current detection signal I represents a mean current value within a predetermined time, whereas the signal $V_7$ represents an instantaneous current value. This signal $V_7$ is delivered to a differentiation circuit 32, at which a change rate of an input current of the transformer 3 is detected. A sample-hold circuit 33 holds input current change rates at a predetermined time in synchronism with electric valve drive signals $V_1$ (corresponding to the positive half cycle) and $V_2$ (corresponding to the negative half cycle) for the inverter bridge 2 to output these change rates thus held as $V_{33A}$ and $V_{33B}$, respectively. Thus, a comparator 34 compares the input current change rate at the positive half cycle with the input current change rate at the negative half cycle to deliver a compared result to a latch circuit 35. The latch circuit 35 switches a switching circuit 37 on the basis of the result latched in synchronism with the PWM signal $V_{15A}$.

On one hand, the welding condition setter 8 sets a welding current reference signal I* and a welding time signal $T_{RUN}$. Thus, the inverter bridge 2 will be operated during the welding time $T_{RUN}$. An error between the current reference signal I* and the current detection signal I is amplified by the current control amplifier 9 and is held at a sample-hold circuit 38. A hold value $V_{38}$ of the sample-hold circuit 38 is compared with a signal $e\Delta$ produced from the triangular wave generator 14. As a result, a PWM signal $V_{12}$ is produced.

On the other hand, the phase of the triangular wave generator 14 is detected by the phase detector 17. The phase signal thus detected is delivered to the distribution circuit 15 and the synchronizing circuit 18. The distribution circuit 15 produces a PWM signal $V_{15A}$ for driving the electric valves 21 and 24 and a PWM signal $V_{15B}$ for driving the electric valves 22 and 23 on the basis of the phase signal. The synchronizing circuit 18 continues to deliver an operating signal to the distribution circuit 15 in synchronism with the phase signal delivered for a time period corresponding to the welding time $T_{RUN}$. The distribution circuit 15 continues to output the PWM signal for a time period during which the operating signal is delivered.

A pulse width modulator 36 generates two kinds of pulses $V_{36A}$ and $V_{36B}$ from the PWM signals $V_{15A}$ and $V_{15B}$ which are output from the distribution circuit 15 to output four pulses in total. As described later, the pulses $V_{36A}$ and $V_{36B}$ have pulse widths obtained by widening to some extent the pulse widths of the pulses $V_{15A}$ and $V_{15B}$, respectively. The switching circuit 37 responds to a command from the latch circuit 35 to select either of two combinations from four kinds of pulses. Namely, when the distribution of the magnetic flux, i.e., the magnetic flux density deviates in the positive direction and therefore an excitation current begins increasing, the switching circuit 37 selects the combination of the pulses $V_{15a}$ and $V_{36B}$ in a manner that the pulse width at the positive cycle becomes narrower and the pulse width at the negative cycle becomes wider. In contrast, when the distribution of the magnetic flux, i.e., the magnetic flux density deviates in the negative direction and therefore an excitation current begins increasing, the switching circuit 37 selects the combination of the pulses $V_{15B}$ and $V_{36A}$ in a manner that the pulse width at the negative cycle becomes narrower and the pulse width at the positive cycle becomes wider.

The drive circuit 16 produces electric valve drive signals $V_1$ and $V_2$ on the basis of two pulses thus selected to drive the inverter bridge 2.

The operation of this circuit will be now described with reference to the waveforms shown in FIG. 3 and the figures subsequent thereto. As previously described, an error between the current reference signal I* and the current detection signal I is amplified (proportionally integrated, in general) by the current control amplifier 9. Its output signal $V_9$ is subjected to sample-holding at a timing of the rise of the phase signal $V_{17}$.

The triangular wave signal $e\Delta$ has a sawtooth waveform as shown in FIG. 3(a) in this embodiment and the two cycles of the sawtooth waveform correspond to one cycle in the operation of this circuit. In other words, the two cycles of the sawtooth waveform correspond to the positive and negative half cycles. In the following description, "one cycle" will be referred to as "one cycle" in the operation of this circuit. A timing pulse $V_{14}$ from the triangular wave generator 14 is output per each half cycle as shown in FIG. 3(b). A phase signal $V_{17}$ output from the phase detector 17 has a waveform as shown in FIG. 3(c) which is synchronized with the timing pulse $V_{14}$. Since the sample-hold is carried out at a timing of the rise of the phase signal $V_{17}$, the control signal $V_9$ continuously varies as indicated by broken lines in FIG. 3(a), but the hold signal $V_{38}$ is constant for a time period of one cycle and is coincident with the control signal $V_9$ only at the moment of the sample-hold. The hold signal $V_{38}$ and the triangular wave signal $e\Delta$ are compared by the comparator 12. The compared result is output as the PWM control signal $V_{12}$ as shown in FIG. 3(d).

As stated above, the sample-hold circuit 38 is constituted to hold the control signal constant for one cycle of the inverter output so that the PWM signals at the positive and negative half cycles are not different from each other. Thus, the pulse width varies per each one cycle, but does not change per each half cycle. Accordingly, ac components applied to the transformer become symmetrical with respect to the polarity, thus allowing the transformer basically not to be subjected to magnetic deviation. Namely, the relationships of $w_1 = w_2$ and $w_3 = w_4$ hold in FIG. 3(d).

The PWM control signal $V_{12}$ is input to the distribution circuit 15 and is separated into signals $V_{15A}$ and $V_{15B}$ for driving two groups of electric valves 21 and 24, and 22 and 23 on the basis of the phase signal $V_{17}$ (FIGS. 3(e) and 3(f)). The synchronizing circuit 18 functions to control the distribution circuit 15 so that when the welding time signal $T_{RUN}$ has arbitrarily occurred or disappeared, the signals $V_{15A}$ and $V_{15B}$ are output in synchronism with the phase signal $V_{17}$ by using one cycle as a unit. Accordingly, as previously described, a control is conducted such that the pulse widths of the signals $V_{15A}$ and $V_{15B}$ are always equal to each other during one cycle. If there is no difference between operating times of the electric valves, no magnetic deviation occurs and the saturation of the transformer 3 does not take place.

However, since there exist in an actual sense the above-mentioned variations in the turn-on, and turn-off times of the electric valves 21 to 24, it is required to correct these variations. Such a correction will be made as follows. By the variable pulse circuit 36, signals $V_{36A}$ and $V_{36B}$ having pulse widths wider than those of the signals $V_{15A}$ and $V_{15B}$ by a preselected width d are generated (FIGS. 3(g) and 3(h)).

On the other hand, the full wave rectification output $V_7$ of the current detector 7A is differentiated by the differentiation circuit 32. The differentiated result, i.e., the current change rate is held by the sample-hold circuit 33. The hold timing is in correspondence with the moment the drive signals $V_1$ and $V_2$ vary from on-state to off-state. Namely, the moment the set of transistors 22 and 23 vary from on-state to off-state, the hold value $V_{33A}$ is obtained, and the moment the set of transistors 21 and 24 vary from on-state to off-state, the hold value $V_{33B}$ is obtained. These two hold values are compared at the comparator 34. A signal of "0" or "1" indicating the compared result is delivered to the latch circuit 35. The latch circuit 35 delivers the signal of "1" or "0" to the switching circuit 37 as a switching signal $V_{35}$ in synchronism with the rise of the signal $V_{15A}$ (this latch timing is shown in FIG. 3(i)). When $V_{33A} > V_{33B}$, viz., the current change rate at the end portion of the time period during which the electric valves 22 and 23 are in on state (during the positive half cycle) is larger than the current change rate at the end portion of the time period during which the electric valves 21 and 24 are in on state (during the negative half cycle), the output of the latch circuit 35 becomes "1". Thus, the switching circuit 37 effects switching operation so as to select the combination of $V_{15A}$ and $V_{35B}$ to output it. Accordingly, the drive signals $V_1$ and $V_2$ output from the drive circuit 16 have waveforms as shown in FIG. 3(j). This allows a time for turning on the electric valves 22 and 23 to be larger than a time for turning on the electric valves 21 and 24, thus to correct the difference between delay times of the electric valves. In this instance, if an excessive correction occurs, the output of the comparator 34 is inverted. As a result, the latch output $V_{35}$ becomes "0". Thus, the switching circuit 37 effects switching operation in a direction opposite to that in the previous operation. Accordingly, a control is conducted such that on-times of the electric valves 22 and 23 are elongated as shown in FIG. 3(k). As just described above, the circuit for preventing magnetic deviation according to this embodiment estimates a magnetic flux level per each cycle on the basis of a current change rate at the end portion of an input current change rate at the end portion of an input current of the transformer 3 to adjust the on-times of the electric valves so that the distribution of the magnetic flux does not deviate, thereby conducting a control to prevent the magnetic deviation of the transformer.

It is to be noted that the reason why latching $V_{35}$ in synchronism with the rise of $V_{15A}$ is nothing but selecting one of timings after the operations of one cycle of the electric valves 21 to 24 are completed and checking the condition of the magnetic flux of the transformer 3 is completed and at which a control for widening the pulse width of $V_{36A}$ can be carried out. In addition to this implementation, as long as such a latching is carried out within a time period of a pulse width during which $V_{15A}$ is turned on, selection of a timing later than the rise may be possible.

Figure 3:
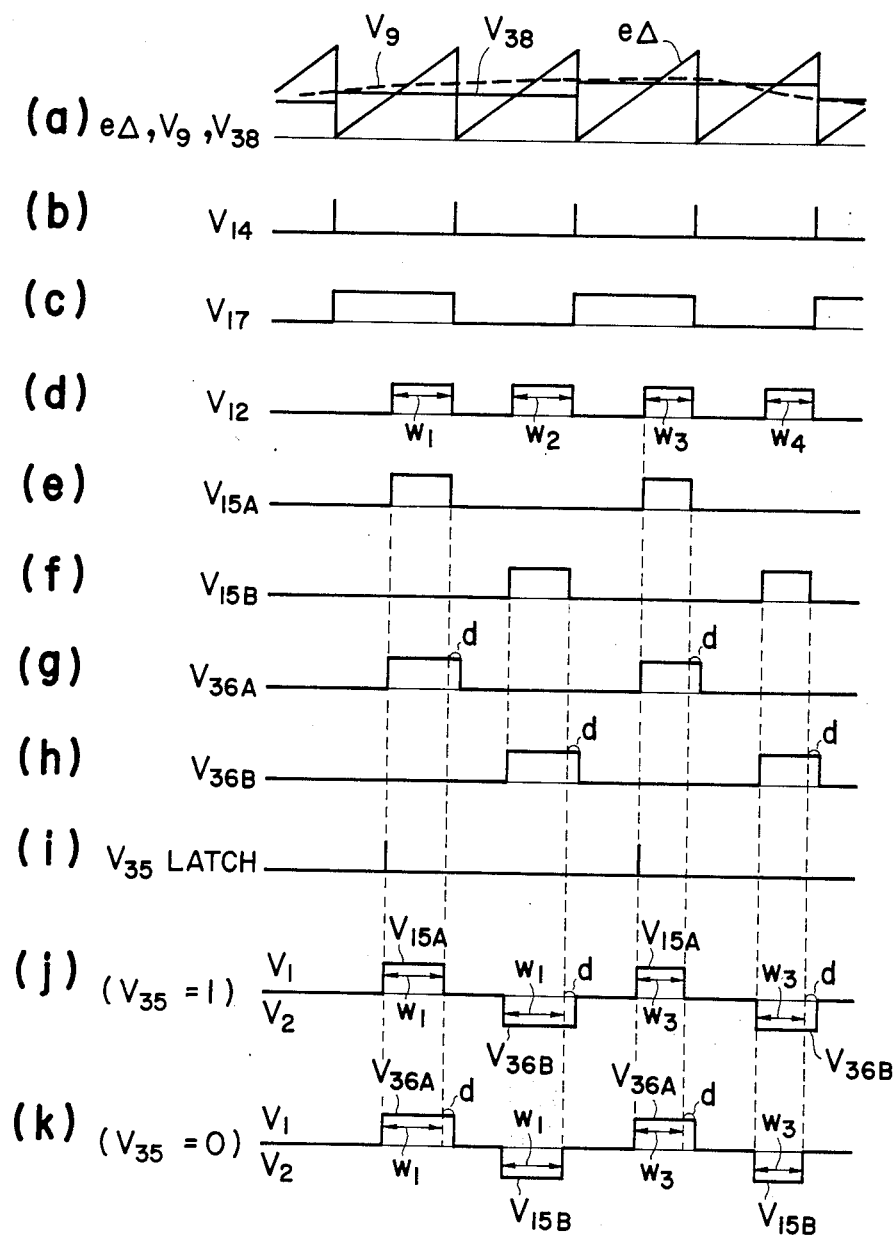
Figure 4:
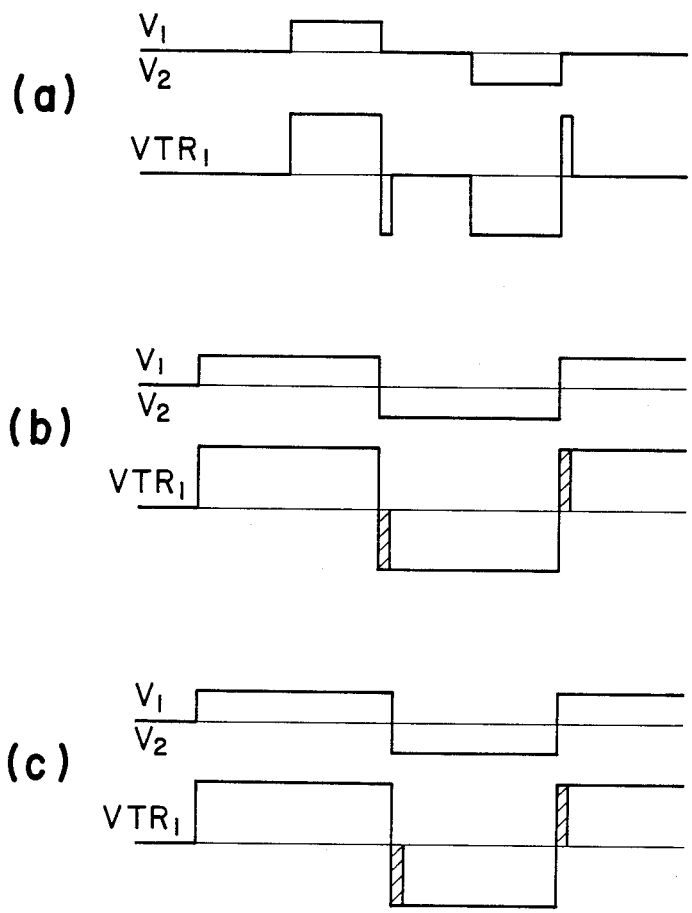

As shown in FIG. 3, the broad pulses $V_{36A}$ and $V_{36B}$ are synchronized with the $V_{15A}$ and $V_{15B}$ at the sides of rise and are widened at the sides of the fall, respectively. Conversely, a method to synchronize the both pulses at the sides of the fall and widen the pulse widths at the sides of the rise is conceivable. However, such a method is not so much preferable. The reason will be explained in conjunction with FIG. 4. Assuming now that the inverter bridge is controlled by $V_1$ and $V_2$ as shown in the upper figure of FIG. 4(a), the primary side voltage $V_{TR1}$ of the transformer 3 varies as shown in the lower figure of FIG. 4(b).

For a time period during which the electric valves 22 and 23 are in on state, the primary side voltage $V_{TR1}$ of the transformer 3 is positive as shown in the figure. However, when the electric valves 22 and 23 are turned off, a current flows through the diode portions of the electric valves 21 and 24 due to the leakage inductance of the transformer, so that a reverse voltage is produced for a short time period as shown. This time varies in dependence upon the pulse width, i.e., the load current value. In the condition shown in FIG. 4(b) where a current flows through the electric valves 21 to 24 at an electric angle of 180 degrees, this time ordinarily corresponds to an electric angle of 10 to 20 degrees. This portion is indicated by hatched lines in FIG. 4(b). At the hatched section, even if the pulse width for turning the electric valves 21 to 24 on is caused to change, the output voltage $V_{TR1}$ does not change. This section becomes an uncontrollable section. Thus, if the pulse width is phase-controlled in the leading direction, the inverter output voltage does not change. For this reason, the control for preventing saturation of the transformer was considered in the prior art to be impossible within this range.

As shown in FIGS. 3(g), (h), the present invention does not control the rising portion of the pulse width, but controls the falling portion thereof. Accordingly, as shown in FIG. 4(c), by widening the terminating portion of the on-time of the electric valves 21 and 24, the output voltage $V_{TR1}$ becomes controllable even in the case where all sections are in on state (full firing). Thus, the control for preventing magnetic deviation of the transformer can be carried out over the full range.

The outline of the operation of this circuit has been described. The operation of the circuit for detecting deviation of the magnetic flux of the transformer will be described in more greater detail in conjunction with FIG. 5. In FIG. 5, the triangular wave eΔ and the PWM signal $V_{12}$ correspond to respective waveforms in FIG. 3. By detecting a current flowing through the transformer 3 using the current transformer 6 to rectify the current detected, the waveform $V_7$ is obtained. Further, by differentiating the waveform $V_7$ using the differentiation circuit 32, the output $V_{32}$ is obtained. FIG. 5(a) shows the case that the magnetic flux of the transformer 3 is balanced wherein respective rectified waveforms $V_7$ are the same. FIG. 5(b) shows the case that the transformer has magnetically deviated wherein respective rectified waveforms $V_7$ are different from each other. Namely, a current flowing through the secondary side of the transformer 3 does not abruptly change by the inductance on the side of the load.

However, when the transformer has magnetically deviated to come to the state nearly equivalent to the saturation, an excitation current increases. Thus, the current change rate at the latter part of the half cycle of the current increases. By observing the signal waveform $V_{32}$ obtained by differentiating the current detection signal $V_7$, this difference can be further clearly detected. The signals $V_{33A}$ and $V_{33B}$ are obtained by sample-holding the signal $V_{32}$ at the time of falls of the electric valve drive signals $V_1$ and $V_2$. By latching the signals $V_{33A}$ and $V_{33B}$ thus obtained at the time of the latch signal $V_{35}$ to compare the latched signals, it is possible to detect the beginning of the magnetic deviation of the transformer at an early stage.

Figure 6:
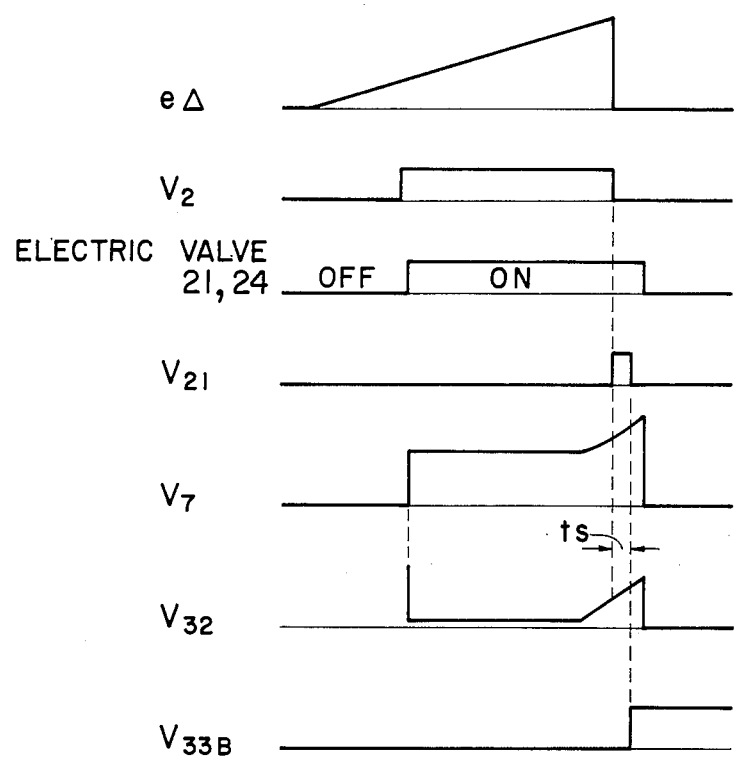

FIG. 6 is a view for explaining the further detailed operation of the sample-hold circuit 33.

By the drive signal $V_2$, the electric valves 21 and 24 are driven wherein these electric valves 21 and 24 have operating delays. For instance, in the case of a power transistor having a rating voltage of 1000 V and a rating current of 300 A, there occur a turn-on delay of about 1 $\mu$s and a turn-off delay of about 15 to 20 $\mu$s. There is employed a circuit arrangement such that during a time period $t_s$ of a one shot signal $V_{21}$ produced at the time of fall of the drive signal $V_2$ (produced within the sample-hold circuit 33), the output $V_{32}$ of the differentiation current 33 is subjected to sampling to provide the hold signal $V_{33B}$. Thus, an improvement is made to grasp the change of an excitation current at the time when the magnetic flux of the transformer approaches the maximum value, i.e., at the termination of a voltage applied to the transformer 3, thereby making it possible to detect the magnetic deviation of the transformer at an early stage.

As stated above, the present invention is implemented to effect a PWM control such that the pulse width does not change in principle within one cycle of the inverter, and to compare the current change rate at the termination of the primary current of the transformer at the positive half cycle with that at the negative half cycle thereby to detect a magnetic deviation of the transformer to effect a control while switching the broad pulse and the narrow pulse, thus making it possible to control the output pulse width of the inverter even at the time of the full firing to realize a control for preventing magnetic deviation of the transformer which can be executed at a high speed over an entire range.

Figure 7:
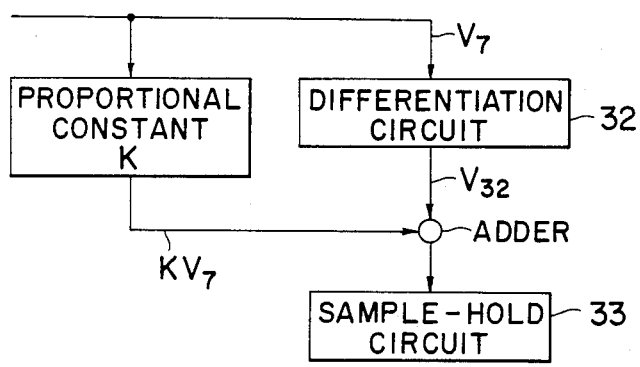
FIG. 7 is a circuit diagram showing another embodiment of a differentiation circuit provided in the circuit shown in FIG. 2.

It is to be noted that there may be employed, instead of the method using the differentiation circuit 32 in FIG. 2, a method as shown in FIG. 7 to add a value obtained by multiplying a proportional constant K by the current output $V_7$ to the output $V_{32}$ of the differentiation circuit 32, thereby to input an added result $V_{32}+KV_7$ of the current change and the current value to the sample-hold circuit 33, thus making it possible to detect the beginning of the saturation of the transformer at an early stage.

While the analog control has been described in the above-mentioned embodiment, it is needless to say that the same effects can be realized by a digital control such as based on the current control using a computer and the PWM control using a necessary number of counters and comparators.

Figure 8:
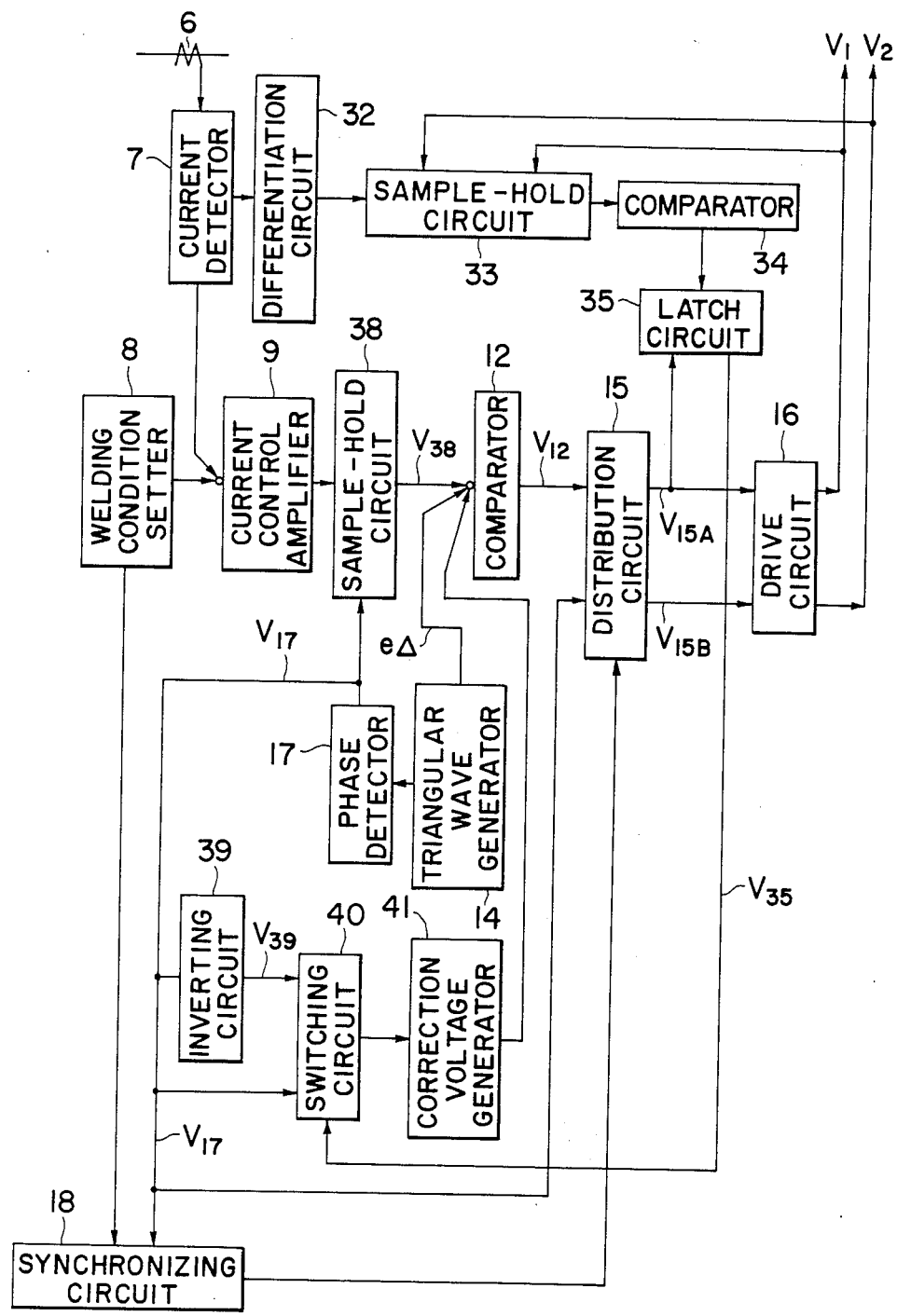
FIG. 8 is a circuit diagram showing another embodiment of a power converter provided with means for preventing magnetic deviation according to the present invention.

A further different embodiment according to the present invention is shown in FIG. 8. The circuit of this embodiment is characterized by inputting a rectangular wave of which polarity is inverted per half cycle to the comparator 12, thereby to change the pulse width of the PWM signal to change the pulse widths on the positive and negative sides of a voltage input to the transformer, thus to prevent magnetic deviation.

In accordance with this embodiment, a switching circuit 40 is caused to be operative by the output $V_{35}$ of the latch circuit 35 to select either the output signal $V_{17}$ of the phase detector 17 or a signal obtained by inverting the polarity of the output signal $V_{17}$ using an inverting circuit 39 to change the selected signal to a corresponding analog signal using a correction voltage generator 41 to add the analog signal thus obtained to the input of the comparator 12.

The detailed operation of this circuit will be described with reference to FIG. 9.

FIG. 9(a) shows the ideal case where there is no correction voltage $V_{41}$ wherein the PWM signal $V_{12}$ is determined only by $e\Delta$ and $V_{38}$ and the pulse widths of $V_{15A}$ and $V_{15B}$ are equal to each other. Actually, the switching circuit 40 selects either $V_{17}$ or $V_{39}$ obtained by inverting $V_{17}$ to deliver the selected one to the correction voltage generator 41. The correction voltage generator 41 outputs an analog signal $V_{41}$ synchronized with the input signal to superimpose the analog signal $V_{41}$ on the hold signal $V_{38}$. It is to be noted that the level of the signal $V_{41}$ is sufficiently smaller than that of the signal $V_{38}$.

FIG. 9(b) shows the case corresponding to $V_{35}=1$ in FIG. 2. In this case, since the output $V_{41}$ of the correction voltage generator 41 is added to $V_{38}$, the output signal $V_{12}$ of the comparator 12 becomes a narrow pulse or a broad pulse per half cycle. Accordingly, the pulse width of $V_{15A}$ becomes narrow and the pulse width of $V_{15B}$ becomes broad, thus to correct the deviation of the magnetic flux produced in the transformer. When the correction becomes excessive, there occurs the state of $V_{35}=0$ as shown in FIG. 9(c). In this case, $V_{41}$ is inverted by the switching circuit 40. In a manner opposite to the above, the pulse width of $V_{15A}$ becomes broad and the pulse width of $V_{15B}$ becomes narrow. Thus, a control such that the deviation of the magnetic flux is cancelled is conducted. The changes of the pulse widths of $V_{15A}$ and $V_{15B}$ shown in FIGS. 9(b) and 9(c) are expressed in an exaggerated manner for the purpose of facilitating the understanding, but it is sufficient in practical use to provide slight changes of the pulse widths.

In the case shown in FIG. 9, the pulse width changes on the side of the rise of the pulse, but when the triangular wave $e\Delta$ is formed as an isosceles triangle, the pulse width varies on the both sides of rise and fall.

It is also needless to say that the means employed in the present invention alone or various combinations thereof can become effective.

In addition, the present invention is also applicable to an apparatus to drive a transformer of the center tap system using an inverter.

As described above, the present invention is implemented to effect a PWM control per each cycle of the inverter output, thus making it possible to perform a control such that no dc component occurs in the transformer even in a transient condition. In carrying out the above-mentioned control, a method is further adopted to compare current rates at the terminating portion of an input current of the transformer per half cycle, thereby to detect the beginning of the magnetic deviation to finely adjust the pulse width, thus making it possible to prevent the magnetic deviation of the transformer before an excitation current based on the magnetic deviation increases. The provision of such a magnetic deviation preventing means allows the transformer to be small-sized and lightened.

In addition, since there is adopted a method to variably shift the end edge of a pulse at the time of finely adjusting the pulse width, it is possible to prevent magnetic deviation of the transformer even in the full-firing condition.

What is claimed is:

1. A pulse width modulator for use with a power converter to deliver a pulse produced based on a dc voltage to the primary side of a transformer with the polarity of said pulse being changed per half cycle, an ac power output from a secondary side of the transformer being adjusted by modulating a pulse width of said pulse, said power converter comprising:

current detector means for detecting a current on the primary side of said transformer, current change rate calculating means for calculating a current change rate from a detection signal detected by said current detector means, current change rate comparing means for separating said current change rate into change rates at positive and negative half cycles to compare said both change rates to judge whether or not the former is larger than the latter, and pulse width correcting means for modulating the pulse width of said pulse delivered to said primary side of said transformer on the basis of the compared result of said current change rate comparing means.

2. A pulse width modulator as set forth in claim 1, wherein said current change rate calculating means includes a differentiation circuit.

3. A pulse width modulator as set forth in claim 2, wherein said current change rate calculating means includes a sample-hold circuit which holds the output of said differentiation circuit at a predetermined timing.

4. A pulse width modulator as set forth in claim 3, wherein said sample hold circuit effects a hold operation in synchronism with the falling edge of said pulse delivered to said primary side of said transformer.

5. A pulse width modulator as set forth in claim 1, wherein said pulse width correcting means includes a pulse width modulator which outputs a first pulse signal having a first pulse width and a second pulse signal having a second pulse width broader than said first pulse width, and a switching circuit which selects either said first or second pulse signal on the basis of the compared result of said current change rate comparing means to deliver the selected pulse signal to the primary side of said transformer.

6. A pulse width modulator as set forth in claim 1, wherein said pulse width correcting means includes a triangular wave generator which generates a triangular wave, a rectangular wave generator which generates a rectangular wave synchronized with said triangular wave, an inverting circuit which inverts said rectangular wave to output an inverted rectangular wave, means for selecting either said rectangular wave or said inverted rectangular wave on the basis of the compared result of said current change rate comparing means to output a superimposition signal obtained by superimposing said selected signal on an analog signal having a magnitude corresponding to the reference pulse width, and pulse generator means which compares said superimposition signal with said triangular wave to generate a pulse to be delivered to said primary side of said transformer.

* * * * *